(12) United States Patent
Roshchin et al.

(10) Patent No.: US 11,113,236 B2
(45) Date of Patent: Sep. 7, 2021

(54) METHOD FOR AUTOMATIC PROCESSING OF A NUMBER OF PROTOCOL FILES OF AN AUTOMATION SYSTEM

(71) Applicant: SIEMENS AKTIENGESELLSCHAFT, Munich (DE)

(72) Inventors: Mikhail Roshchin, Munich (DE); Alexander Storl, Hetzles (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 815 days.

(21) Appl. No.: 15/301,638

(22) PCT Filed: Mar. 24, 2015

(86) PCT No.: PCT/EP2015/056234
§ 371 (c)(1),
(2) Date: Oct. 3, 2016

(87) PCT Pub. No.: WO2015/150164
PCT Pub. Date: Oct. 8, 2015

(65) Prior Publication Data
US 2017/0024400 A1    Jan. 26, 2017

(30) Foreign Application Priority Data
Apr. 4, 2014  (EP) .................................... 14163531

(51) Int. Cl.
*G06F 16/11*       (2019.01)
*G06F 11/34*       (2006.01)
(Continued)

(52) U.S. Cl.
CPC ........ *G06F 16/116* (2019.01); *G05B 19/0425* (2013.01); *G06F 11/3476* (2013.01); *G06F 16/84* (2019.01); *G05B 2219/24015* (2013.01)

(58) Field of Classification Search
CPC ...... G05B 2219/24015; G05B 19/0425; G06F 11/3476
See application file for complete search history.

(56) References Cited

U.S. PATENT DOCUMENTS

2003/0167406 A1* 9/2003 Beavers .............. G06F 11/0709
726/22
2004/0254919 A1* 12/2004 Giuseppini ....... G06F 17/30964
(Continued)

FOREIGN PATENT DOCUMENTS

| CN | 1645389 A | 7/2005 |
|---|---|---|
| CN | 101394267 A | 3/2009 |

(Continued)

*Primary Examiner* — Hosain T Alam
*Assistant Examiner* — Anthony G Gemignani
(74) *Attorney, Agent, or Firm* — Henry M. Feiereisen LLC

(57) ABSTRACT

A method for automatically generating and processing a number of protocol files of different types of an automation system of a technical plant includes identifying a number of relevant protocol files of different types from the generated protocol files based on at least one protocol parameter, transforming the identified relevant protocol files of different types into relevant standardized protocol files of the same type by using an agent-based software, analyzing and/or processing data sets of the relevant standardized protocol files of the same type, and outputting and/or saving the data sets of the relevant standardized protocol files.

27 Claims, 2 Drawing Sheets

(51) Int. Cl.
    *G05B 19/042*     (2006.01)
    *G06F 16/84*     (2019.01)

(56) References Cited

U.S. PATENT DOCUMENTS

| | | |
|---|---|---|
| 2005/0159927 A1 | 7/2005 | Cruz et al. |
| 2006/0184529 A1* | 8/2006 | Berg .................. G06F 11/0709 |
| 2007/0038889 A1 | 2/2007 | Wiggins et al. |
| 2012/0005542 A1 | 1/2012 | Petersen et al. |
| 2012/0222048 A1 | 8/2012 | Bharathula |

FOREIGN PATENT DOCUMENTS

| | | |
|---|---|---|
| CN | 101582883 A | 11/2009 |
| CN | 101938459 A | 1/2011 |
| CN | 10 309 2980 A | 5/2013 |
| DE | 102006037291 A1 | 5/2007 |
| DE | 102006003156 A1 | 7/2007 |
| EP | 2 927 818 A1 | 10/2015 |
| EP | 2 928 157 A1 | 10/2015 |
| FR | 2 806 494 A1 | 9/2001 |
| WO | WO 2005093607 A1 | 10/2005 |

\* cited by examiner

METHOD FOR AUTOMATIC PROCESSING OF A NUMBER OF PROTOCOL FILES OF AN AUTOMATION SYSTEM

CROSS-REFERENCES TO RELATED APPLICATIONS

This application is the U.S. National Stage of International Application No. PCT/EP2015/056234, filed Mar. 24, 2015, which designated the United States and has been published as International Publication No. WO 2015/150164 A1 which claims the priority of European Patent Application, Serial No. 14163531.8, filed Apr. 4, 22014, pursuant to 35 U.S.C. 119(a)-(d).

BACKGROUND OF THE INVENTION

The invention relates to a method for the automatic processing of a number of log files of an automation system in a technical plant such as a power plant.

Large-scale plants such as steam and gas turbine plants, chemical plants, steelworks and rolling mills are complex technical systems comprising a multiplicity (e.g. hundreds) of components such as sensors, actuators, drives, etc., each of which captures and supplies possibly a plurality of measured values per second for subsequent processing and transfer.

In order to monitor and control components such as turbines, evaporators, generators, sensors, drives and actuators in the technical plant, the data received from the components is processed, analyzed and interpreted. It is then possible to detect deviations from a predetermined normal status as early as possible, and if applicable to prevent damage to and/or failure of the component, e.g. the turbine.

In this context, the quantity of data/measured signals to be evaluated and the complexity of possible dependencies between the data/measured signals are usually far too great to allow effective analysis of the data/measured signals by an operator.

For the purpose of controlling and monitoring the technical plant in this case, the plant comprises an automation system which is generally divided into an operation and observation level, an automation and process level and a field level, these being interconnected via a communication system, in particular one or more data bus systems.

The data, e.g. measured signals and status signals from individual components such as sensors, actuators, drives, turbines, automation units etc., is usually stored together in log files, which describe one or more events that have occurred in one or more components and/or component groups, and transferred to relevant components of the technical plant.

In practice, automatic control and/or monitoring gives rise to the problem of increasing numbers of log files being generated when an event occurs in the technical plant, e.g. when an abnormal incident occurs. This is typically caused by e.g. defective sensors and/or defective plant parts which supply additional measured values and hence additional log files. This makes it harder for the operator to scan and understand the generated log files. It is also difficult for the operator correctly to assess the event that has occurred.

Furthermore, a multiplicity of different types of log files are generated, their content being neither compatible nor comparable.

US 2003/0167406 A1 discloses a method for supplying an alarm report on the basis of a number of events in a plant. The method comprises the provision of a multiplicity of output information from the plant, at least some of which has differing formats. Each item of output information contains an event relating to the plant. The output information is converted into a common format, said common format being supplemented by additional information using files containing additional information. Applying at least one rule from a standard framework, the alarm report is applied to the common format containing the additional information.

FR 2 806 494 A1 discloses a method for managing and updating an event log and for reducing data of a number of event logs (also referred to as log files), wherein the information in each individual event log is filtered and reduced to selected information which is classified as valid in the event log.

The object of the invention is to specify a simple method for automatically processing a multiplicity of log files of an automation system in a technical plant.

This object is achieved by the features in the independent claims. Preferred embodiments are specified in the dependent claims in particular.

The method according to the invention for automatically processing a number of generated log files of an automation system in a technical plant, in particular heterogeneous and/or incompatible log files of different types, comprises at least the following steps:
  identifying a number of relevant log files of different types from the multiplicity of generated log files on the basis of at least one log parameter, in particular a capture timestamp, a capture timeframe, a capture type and/or a capture location,
  transforming the identified relevant log files of different types into relevant standardized log files of the same type, including associated data records, by means of agent-based software,
  analyzing and/or processing the relevant standardized log files of the same type by means of uniform evaluation methods such as statistical evaluations, time analyses, event analyses, pattern analyses, text analyses and sequence analyses, and
  outputting and/or saving the relevant standardized log files.

In particular, the invention has the advantage that the outputs in respect of status, time, reporting and/or warning information are processed, analyzed and output in a uniform manner, irrespective of the log type. Consequently, the analysis of the multiplicity of generated log files and their content is significantly faster and clearer. In addition to this, duplicate or multiple instances of information are reduced, resulting in reduced and clearer information output, and a reduced memory requirement. In particular, dependencies of different generated log files and/or validation checks/inconsistencies can be identified and optionally output and corrected more quickly. In particular, the method according to the invention allows a single analysis method to be used for the complete analysis of all generated log files of all types in a technical plant.

In the first step, the multiplicity of generated log files is reduced to a sequence or group of relevant log files, e.g. by means of filtering according to e.g. time, event or location, and by means of sorting/grouping. By virtue of such a reduction, it is possible to effect a simple and rapid analysis of those log files in this sequence or group which are relevant to an individual event. In particular, simple dependencies of relevant log files in the identified sequences and/or their correlations can be determined without resource-intensive additional analysis.

Additionally or alternatively, a plurality of relevant log files can be stored together to form at least one group of relevant log files, in particular within a sequence that has been determined.

When transforming the identified relevant log files of different types into relevant standardized log files of the same type, including associated and optionally further standardized/reduced data records, by means of agent-based software, provision is made for converting e.g. simple text files such as log, txt, dmp, csv, and xml files having fixed field lengths and one line per data record into CSV or XML files (CSV=comma separated values or XML=extensible markup language).

The agent-based software is configured such that a software agent is installed on an operating system, in particular a Windows system, for example. This software agent examines the relevant log files (defined log files) in real time for conditions which are defined by regular expressions. These conditions can also be applied to relevant log files which are examined in a fully automated manner.

For example, the method can be used in a management unit running a windows-based operating system to identify and observe a CPU load, in order to ascertain whether a defined limit value is exceeded in the operating system. If the CPU load is greater than 90%, an event report is sent to a remote facility, in particular a remote service center, and the operator, in particular a technical engineer, can proactively investigate and apply measures.

In a further example, the relevant log file (a log file called PDLRTSEH.log in particular) can be scanned for specified content, in particular an "ACCESS_VIOLATION" entry. A corresponding module, e.g. a so-called PDLRT or graphics runtime module, is implemented e.g. in the relevant log file of a so-called WinCC Scada system for this purpose. If the entry is present in the relevant log file, it is sent to the remote service center.

Furthermore, previously grouped relevant log files of different types can be transformed into a single group file of the same type, in particular a single XML file. Alternatively or additionally, all relevant log files can be transformed into a single summary file of the same type, in particular a single XML file. The relevant log files of different types can also be transformed into a block/line file of the same type for each block group or line respectively, in particular an XML block/line file. A conventional transformation method can be used in this case. Additionally, the method described in the parallel European application having the application number 14163510.2 can be used to process, in particular compress, the contents of each log file by means of a log compressor. The subject matter of the European application having the application number 14163510.2, in particular the manner in which data records of the relevant log files are compressed, is hereby included by reference.

Furthermore, the method described in the parallel European application having the application number 14163511.0 can be used to analyze and/or evaluate at least one event in a technical plant from a multiplicity of generated log files of an automation system in the technical plant, in particular to further reduce the multiplicity of generated log files to a sequence of relevant log files which are grouped in particular. The subject matter of the European application having the application number 14163511.0, in particular the described manner in which the generated log files are reduced to a sequence of relevant log files, is hereby included by reference.

According to a possible embodiment, the data records of the relevant standardized log files are processed by means of statistical evaluations. For example, they may be processed by means of a so-called Levenshtein distance, wherein the data records of the relevant standardized log files are encoded and the encoding standardized, in particular reduced and shortened in order to further accelerate the analysis.

According to a further embodiment, the data records of the relevant standardized log files are processed by means of time analyses. In particular, capture timestamps, capture timeframes, capture types and/or capture locations of the data records can be identified and used for the purpose of sorting and/or grouping and/or filtering/reducing the data records.

For example, the data records of the relevant log files are processed by means of event analyses. Alternatively or additionally, the data records of the relevant standardized log files may be processed by means of pattern analyses and/or text analyses.

For example, two or more relevant standardized log files which were generated at the exact same time point can be stored together. The analysis can be simplified thereby, in particular shortened, since the resource-intensive identification of time dependencies between the relevant standardized log files is not required.

The data records of the relevant standardized log files can also be processed by means of sequence analyses and/or error analyses. The cited analysis methods can be combined as desired in this case.

For example, at least one reference pattern can be identified for at least one of the sequences of relevant standardized log files of a timeframe or event to be analyzed. At least one reference pattern can be identified for recurring events, in particular statuses and/or process flows in a technical plant, wherein said reference pattern describes or represents the order of the generated relevant standardized log files describing this status and/or process flow. The comparison and analysis of the generated standardized log files is considerably simplified thereby.

The described method is characterized in that the originally incompatible and incomparable message parts of the different types of log files can be sorted and analyzed significantly more quickly and easily as a result of firstly transforming all relevant log files of different types into standardized log files of one and the same type. Additionally, the data records of the standardized log files of the same type can be further processed by means of the method described in the parallel European application having the application number 14163510.2 for processing log files, compressing these by means of e.g. character reduction, encoding these reduced character strings, and grouping similar and/or identical encoded character strings, and by means of the method described in the parallel European application having the application number 14163511.0 for analyzing and/or evaluating at least one event in a technical plant from a multiplicity of generated log files of an automation system in the technical plant, in particular for further reducing the multiplicity of generated log files to a sequence of grouped relevant log files.

The method is preferably used in an automation system of a technical plant such as a power plant.

In a simple embodiment, the method according to the invention is implemented in a component of an automation system of a technical plant, wherein the automation system comprises at least an operation and observation level, an automation and process level and a field level, these being interconnected via a communication system.

The properties, features and advantages described above in respect of the invention, and the manner in which these are achieved, are clearer and easier to understand in the following description of exemplary embodiments, these being explained in detail with reference to the drawings in which:

BRIEF DESCRIPTION OF THE DRAWING

Corresponding parts are denoted by the same reference signs in all of the figures.

DETAILED DESCRIPTION OF PREFERRED EMBODIMENTS

Figure 1:
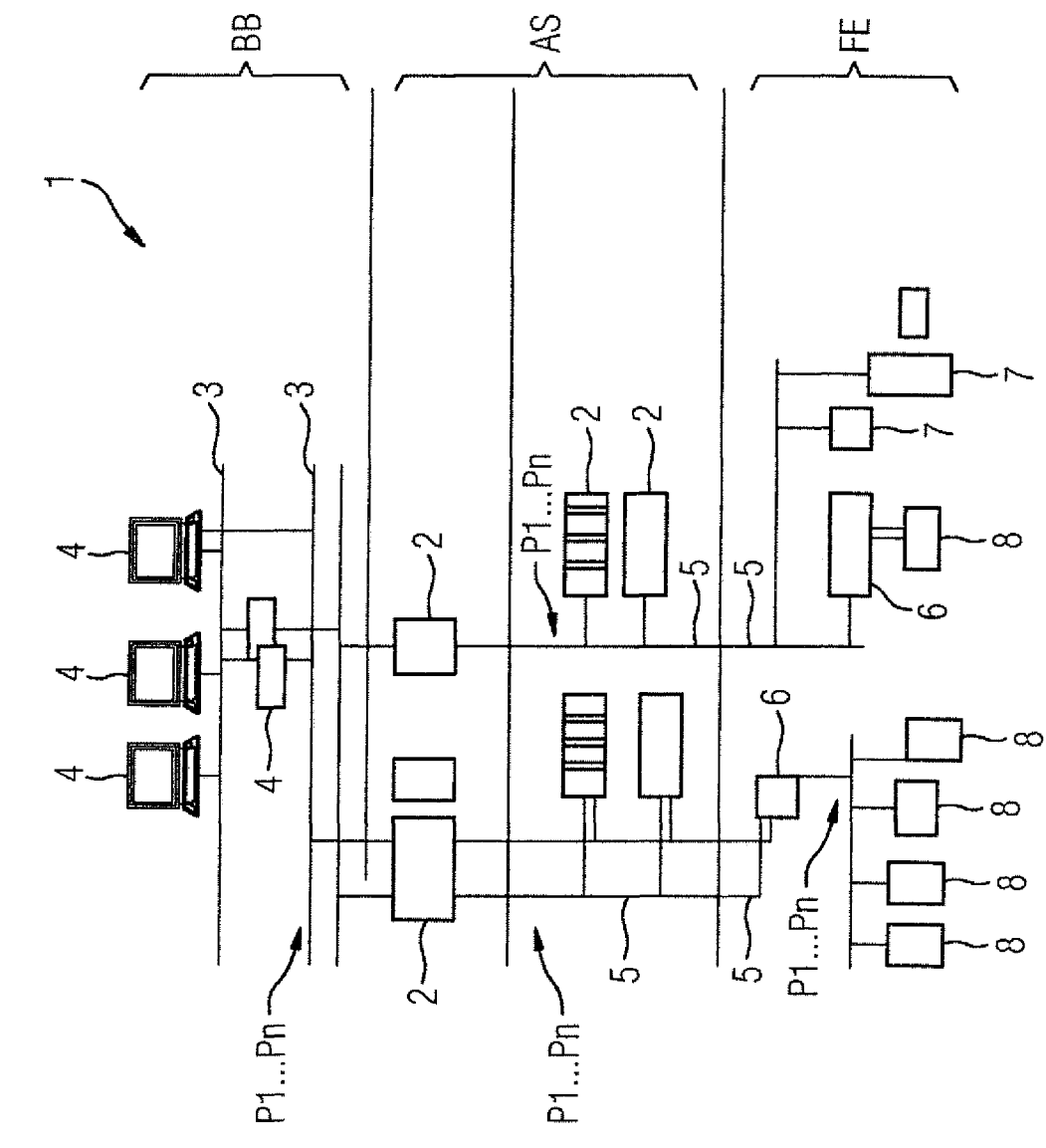
FIG. 1 schematically shows an exemplary embodiment of an automation system for controlling and monitoring a technical plant, and FIG. 2 schematically shows an exemplary embodiment of a method for processing log files of different types which are generated in the automation system.

FIG. 1 schematically shows a block diagram of an exemplary embodiment of an automation system 1 in a technical plant, e.g. a power plant or a chemical plant.

The automation system 1 comprises a number of automation devices 2 at a process level AS (also referred to as an automation level), which are connected to and communicate with each other and a management unit 4 via a shared data bus 3 at an operation and observation level BB. The automation devices 2 are also connected to field devices 6 via a field bus 5 at a field level FE and communicate with each other.

The data bus 3 may be an Ethernet bus, for example, or other suitable data transfer system. The field bus 5 may be an Ethernet-based field bus 5, for example, or other suitable data transfer system, and may be wireless or wire-based. The data bus 3 and/or the field bus 5 may form a computer network in this case.

The automation devices 2 may comprise both freely programmable and stored-program processors (in the form of a processor unit in particular) and respectively control, regulate and/or monitor a plurality of component groups 7 or subsystems of the individual parts of the technical plant. In particular, the control, regulation and/or monitoring of the technical plant also comprises analysis and miscellaneous processing of the data including e.g. measured signals, control signals, input and output signals, intermediate signals, saved data and processing data.

The management units 4 may be data processing units such as a personal computer or other suitable operation and observation unit by means of which the technical plant is monitored and controlled.

The field devices 6 may be e.g. compact and freely programmable or stored-program controls (in the form of a processor unit and/or at least one partly hard-wired or logical circuit arrangement in particular) which control, regulate or monitor individual components 8 of plant parts such as sensors and/or actuators, and which are connected to the automation device 2 (also referred to as a control device) via the field bus 5 for the purpose of communication.

During the operation of a technical plant such as a power plant, large amounts of data are transferred via the data bus 3 and the field bus 5 in the form of log files P1 to Pn comprising control commands, status reports and/or fault reports which are triggered by control interventions in the management unit 4 or displayed on screens or other display devices of the management unit 4. A multiplicity of control interventions are required in this case, particularly when commissioning and when starting up and shutting down the plant, resulting in a correspondingly large number of feedback reports that must be observed. This results in a considerable workload for the operator.

Figure 2:
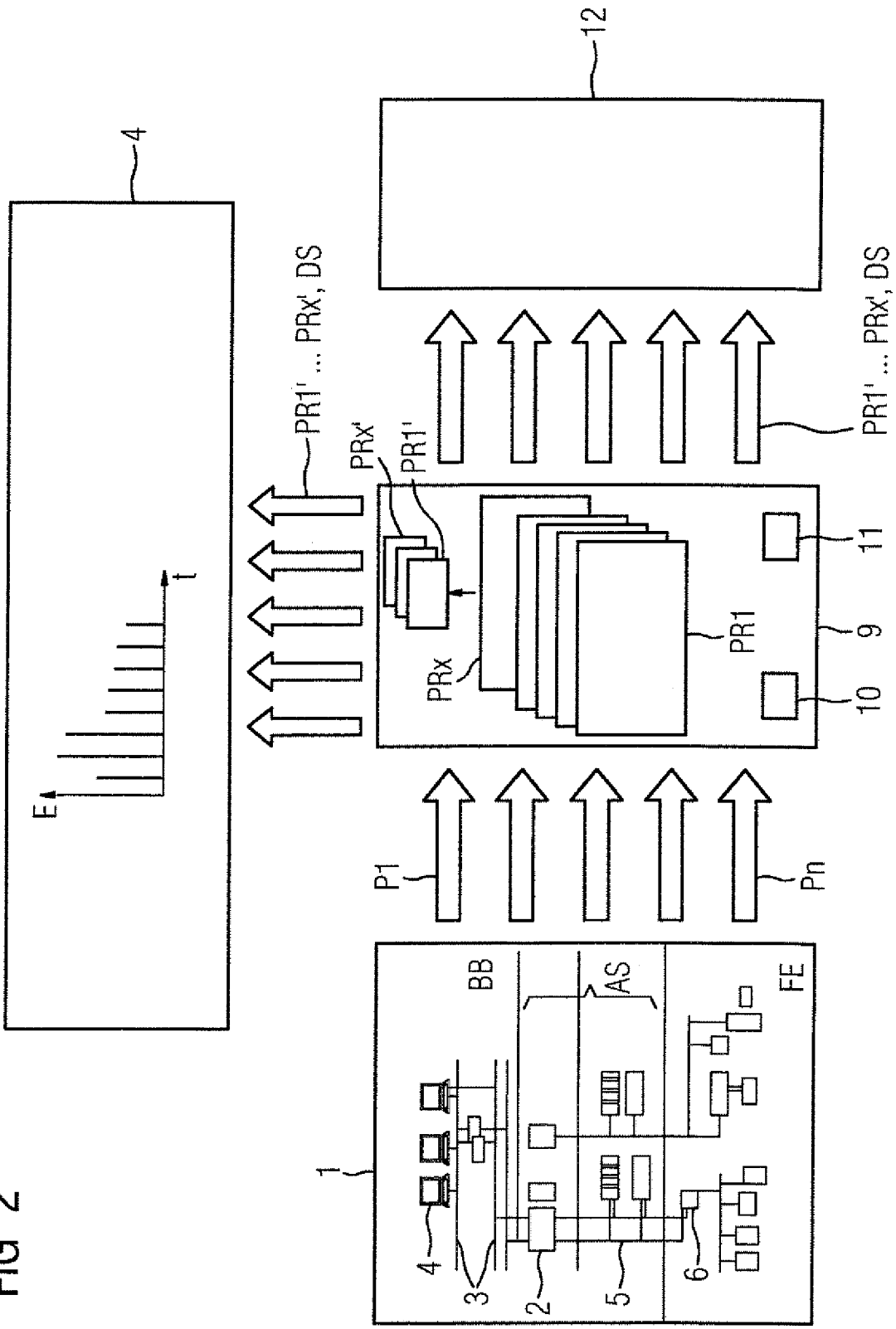

FIG. 2 schematically shows an exemplary embodiment of a method for processing, in particular preprocessing, log files P1 to Pn which are generated in the automation system 1, transferred via the data bus 3 and/or the field bus 5, and exchanged between the units of the automation system 1, in particular between the operating units 4, the automation devices 2 and the field devices 6.

The log files P1 to Pn comprise in each case at least a capture timestamp and a text, in particular a message, a report and a status text, which describe at least one event. In addition, the log files P1 to Pn may comprise as text a system time, a version/revision number and further information. For example, a plurality of log files P1 to Pn may describe one event or a plurality of events in this case. Files of different types including e.g. *log, *xml, *txt, *nfo and/or *dmp files are created and generated as log files P1 to Pn in an automation system 1 of a technical plant, for example.

A computer program product in particular is implemented in at least one of the components of the automation system 1, wherein said computer program product may be loaded directly into a memory of a digital computer such as a management unit 4 and comprises program code parts which are suitable for performing steps of the method described below. Alternatively, the computer program product may also be loaded into an automation device.

Alternatively, a computer-readable storage medium (e.g. any suitable type of memory) comprising instructions (e.g. in the form of program code) may be provided, said instructions being executable on a computer such as a management unit 4 and enabling the management unit 4 to perform steps of the method described below.

The method for automatically processing, in particular preprocessing, the multiplicity of generated log files P1 to Pn, in particular heterogeneous or incompatible files, is implemented as a log transformer 9 and comprises at least the following steps:

identifying a number of relevant log files PR1 to PRx of different types from the multiplicity of generated log files P1 to Pn on the basis of at least one log parameter, in particular a capture timestamp, a capture timeframe, a capture type and/or a capture location, transforming the identified relevant log files PR1 to PRx of different types into relevant standardized log files PR1' to PRx' of the same type, including associated data records DS, by means of agent-based software, analyzing and/or processing the relevant standardized log files PR1' to PRx' of the same type by means of uniform evaluation methods such as statistical evaluations, time analyses, event analyses, pattern analyses, text analyses and sequence analyses, and outputting and/or saving the relevant standardized log files PR1' to PRx' including the associated data records DS.

The preprocessing and in particular standardization of the relevant log files PR1 to PRx by means of transformation into relevant standardized log files PR1' to PRx' of a single type allows uniform processing, analysis and/or output of status, time, reporting and/or warning information irrespective of log type. Consequently, the analysis of the multiplicity of generated log files P1 to Pn and their content is significantly faster and clearer. In other words: the method according to the invention allows a single analysis method to be used for the complete analysis of all generated log files P1 to Pn of all types in a technical plant.

In the first step, the multiplicity of generated log files P1 to Pn are reduced to a sequence or group of relevant log files PR1 to PRx e.g. by means of filtering, e.g. according to time, event or location, and by means of sorting/grouping. This makes it possible to determine simple dependencies of relevant log files PR1 to PRx in the identified sequences and/or their correlations without resource-intensive additional analysis.

In this context, the message part of each data record DS in the log files P1 to Pn may comprise e.g. text messages such as reports, statuses, text, information, warnings etc. The respective data record DS may take the form of a table, a database or other suitable form having field divisions.

The message part of the respective generated log file P1 to Pn may be contained in one or more fields of the associated data record DS, for example. Further fields of the data record DS contain log and/or system information such as e.g. system time, version number, revision number, etc.

In this case, the data records DS can be sorted on the basis of a respective associated timestamp, in particular chronologically sorted in ascending or descending order, for example.

In particular, the associated timestamp may be a capture timestamp for the underlying message, which in particular describes an event in the technical plant such as "ambient temperature in permitted range", "first start activated", "pump failed", "turbine started", etc. Alternatively or additionally, the data records DS may be sorted on the basis of alternative or additional log parameters such as capture location, capture type and/or capture timeframe.

When transforming the identified relevant log files PR1 to PRx of different types into relevant standardized log files PR1' to PRx' of the same type, including the data records DS, by means of agent-based software, provision is made for converting e.g. simple text files such as log, txt, dmp, csv, xml files having fixed field lengths and one line per data record into CSV or XML files (CSV=comma separated values or XML=extensible markup language).

Depending on the specified requirement, previously grouped relevant log files PR1 to PRx of different types can be transformed into a single group file of the same type, in particular a single XML file. Alternatively or additionally, all relevant log files PR1 to PRx can be transformed into a single summary file of the same type, in particular a single XML file.

The transformation method may be a conventional transformation method.

For example, a log file might originally contain the following:

"Registry Export from:
"HKEY_LOCAL_MACHINE\SOFTWARE\Microsoft\
  Windows
NT\CurrentVersion\HotFix"
System Name RegEntry Name
RemTest10 KB924667-v2
Security Update for Windows Server 2003 (KB924667-v2)
RemTest10 KB925148
Hotfix for Windows Server 2003 (KB925148)"

After the transformation, the log file contains the following content in standardized format, in particular after removal of spaces, blank lines, etc.:

```
"<?xml version="1.0" encoding="ISO-8859-1" ?>
- <Hotfixes>
- <Entry>
  <System>RemTest10</System>
  <RegEntry>KB924667-v2</RegEntry>
  <Name>Security Update for Windows Server 2003 (KB924667-v2)</Name>
  </Entry>
- <Entry>
  <System>RemTest10</System>
  <RegEntry>KB925148</RegEntry>
  <Name>Hotfix for Windows Server 2003 (KB925148)</Name>
  </Entry>
..</Hotfixes>"
```

It is also possible to use the method described in the parallel European application having the application number 14163510.2 for the purpose of processing, in particular compressing, the contents of each relevant standardized log file PR1' to PRx' by means of a log compressor 10.

It is furthermore possible to use the method described in the parallel European application having the application number 14163511.0 for the purpose of analyzing and/or evaluating at least one event in a technical plant from a multiplicity of generated log files P1 to Pn of an automation system 1 of the technical plant, in particular for the purpose of further reducing the multiplicity of generated log files P1 to Pn to a sequence of grouped relevant standardized log files PR1' to PRx' by means of a log analyzer 11.

In this case, the log compressor 10 and the log analyzer 11 can be designed as separate units and arranged downstream of the log transformer 9 (not illustrated in greater detail). Alternatively, these can be implemented as integrated units in the log transformer 9 (illustrated).

According to a possible embodiment, the data records of the relevant standardized log files PR1' to PRx' are processed by means of statistical evaluations. For example, they may be processed by means of a probability calculus, in particular probabilities of occurrence of events and the so-called Levenshtein distance. To this end, the data records DS of the relevant standardized log files PR1' to PRx' can be encoded and this encoding standardized, in particular reduced and shortened in order to further accelerate the analysis.

According to a further embodiment, the data records DS of the relevant standardized log files PR1' to PRx' are processed by means of time analyses. In particular, capture timestamps, capture timeframes, capture types and/or capture locations of the data records DS can be identified and used for the purpose of sorting and/or grouping and/or filtering/reducing the data records DS.

For example, the data records DS of the relevant standardized log files PR1' to PRx' are processed by means of event analyses. Alternatively or additionally, the data records DS of the relevant standardized log files PR1' to PRx' may be processed by means of pattern analyses and/or text analyses.

For example, two or more relevant standardized log files PR1 to PRx' which were generated at the exact same time point can be stored together. The data records DS of the relevant standardized log files PR1' to PRx' may also be processed by means of sequence analyses and/or error analyses. The previously described analysis methods may be combined as desired in this case.

For example, at least one reference pattern may be identified for at least one of the sequences of relevant standardized log files PR1' to PRx' of a timeframe or an event that is to be analyzed. At least one reference pattern may be identified for recurring events, in particular statuses and/or process flows in a technical plant, wherein said reference pattern describes or represents the order of the generated relevant standardized log files PR1' to PRx' describing this status and/or process flow. The comparison and analysis of the generated relevant standardized log files PR1' to PRx' is considerably simplified thereby.

The described method is characterized in that the originally incompatible and incomparable message parts or data records DS of the different types of log files P1 to Pn can be sorted and analyzed significantly more quickly and easily as a result of firstly transforming all relevant log files PR1 to PRx of different types into relevant standardized log files PR1' to PRx' of one and the same type.

For subsequent processing of the relevant standardized log files PR1' to PRx' and/or their data records DS, these can be supplied to one of the management units 4 for output to a screen and further analysis and evaluation of the event(s), and e.g. stored in a memory 12.

Although the invention is illustrated and described in detail with reference to preferred exemplary embodiments, it is not limited by the examples disclosed, and other variations may be derived therefrom by a person skilled in the art without thereby departing from the scope of the invention. In particular, the log transformer 9 may be implemented at a suitable location in a component of the automation system 1.

The invention claimed is:

1. A method for automatically processing a number of generated log files of different types of an automation system in a technical plant, comprising:
   monitoring and controlling the technical plant with the automation system,
   identifying, with agent-based software implemented in a component of the automation system, a number of relevant log files of different types from the number of generated log files of the automation system based on at least one log parameter, wherein the relevant log files comprise at least one of measured signals and status signals from individual components of the technical plant;
   transforming, with the agent-based software, the identified relevant log files of different types into relevant standardized log files of a same type;
   processing and analyzing, with the agent-based software, data sets of the relevant standardized log files of the same type; and
   outputting, with the agent-based software, the data sets of the relevant standardized log files in order to monitor and control with the automation system the individual components of the technical plant.

2. The method of claim 1, wherein the data sets of the relevant standardized log files are processed by statistical evaluation.

3. The method of claim 1, wherein the data sets of the relevant standardized log files are processed by time analysis.

4. The method of claim 1, wherein the data sets of the relevant standardized log files are processed by event analysis.

5. The method of claim 1, wherein the data sets of the relevant standardized log files are processed by pattern analysis.

6. The method of claim 1, wherein the data sets of the relevant standardized log files are processed by text analysis.

7. The method of claim 1, wherein the data sets of the relevant standardized log files are processed by sequence analysis.

8. The method of claim 1, wherein the data sets of the relevant standardized log files are processed by error analysis.

9. The method of claim 1, further comprising detecting a deviation from a predetermined normal status of an individual component.

10. The method of claim 1, further comprising reducing a number of duplicate or multiple instances of information in the relevant log files.

11. The method of claim 1, further comprising analyzing all relevant log files of different types with a single analysis method.

12. The method of claim 1, wherein the automation system comprises an operation and observation level, an automation level; a field level; and a communication system connecting the operation and observation level, the automation level and the field level.

13. The method of claim 1, wherein the generated log files are generated when the technical plant is commissioned, started-up, operated, or shut-down.

14. A technical plant, comprising an automation system configured to monitor and control the technical plant, the automation system comprising a number of generated log files of different types, and agent-based software implemented in a component of the automation system, wherein the agent-based software automatically processes the generated log files by identifying a number of relevant log files of different types from the number of generated log files based on at least one log parameter, wherein the relevant log files comprise at least one of measured signals and status signals from individual components of the technical plant, wherein the agent-based software further transforms the identified relevant log files of different types into relevant standardized log files of a same type, processes and analyses data sets of the relevant standardized log files of the same type, and outputs the data sets of the relevant standardized log files in order to monitor and control with the automation system the individual components of the technical plant.

15. The technical plant of claim 14, wherein the data sets of the relevant standardized log files are processed by statistical evaluation.

16. The technical plant of claim 14, wherein the data sets of the relevant standardized log files are processed by time analysis.

17. The technical plant of claim 14, wherein the data sets of the relevant standardized log files are processed by event analysis.

18. The technical plant of claim 14, wherein the data sets of the relevant standardized log files are processed by pattern analysis.

19. The technical plant of claim 14, wherein the data sets of the relevant standardized log files are processed by text analysis.

20. The technical plant of claim 14, wherein the data sets of the relevant standardized log files are processed by sequence analysis.

21. The technical plant of claim 14, wherein the data sets of the relevant standardized log files are processed by error analysis.

22. The technical plant of claim 14, wherein the automation system is configured to detect a deviation from a predetermined normal status of an individual component.

23. The technical plant of claim 14, wherein the automation system is configured to reduce a number of duplicate or multiple instances of information in the relevant log files.

24. The technical plant of claim 14, wherein the automation system is configured to analyze all relevant log files of different types with a single analysis method.

25. The technical plant of claim 14, wherein the automation system comprises an operation and observation level, an automation level; a field level; and a communication system connecting the operation and observation level, the automation level and the field level.

26. The technical plant of claim 14, wherein the generated log files are generated when the technical plant is commissioned, started-up; operated, or shut-down.

27. An automation system configured to monitor and control a technical plant, the automation system comprising:
   a plurality of automation devices at an automation level, with the automation devices communicating with each other and with a management unit via a shared data bus at an operation and observation level, and further connected to field devices via a field bus at a field level;
   wherein the automation system is configured to
   monitor and control the technical plant by
   identifying, with agent-based software implemented in an automation device, a number of relevant log files of different types from the number of generated log files of the automation system based on at least one log parameter, wherein the relevant log files comprise at least one of measured signals and status signals from the field devices;
   transforming, with the agent-based software, the identified relevant log files of different types into relevant standardized log files of a same type;
   processing and analyzing, with the agent-based software, data sets of the relevant standardized log files of the same type; and
   outputting, with the agent-based software, the data sets of the relevant standardized log files in order to monitor and control the field devices.

\* \* \* \* \*